United States Patent
Takase et al.

(12) 
(10) Patent No.: US 9,069,119 B2
(45) Date of Patent: Jun. 30, 2015

(54) LENS UNIT AND METHOD FOR MANUFACTURING THE SAME

(71) Applicant: FUJIFILM Corporation, Tokyo (JP)

(72) Inventors: Yoshiyuki Takase, Saitama (JP); Motokazu Shimizu, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/223,387

(22) Filed: Mar. 24, 2014

(65) Prior Publication Data

US 2014/0204476 A1    Jul. 24, 2014

Related U.S. Application Data

(63) Continuation of application No. PCT/JP2012/073269, filed on Sep. 12, 2012.

(30) Foreign Application Priority Data

Sep. 30, 2011    (JP) .................................. 2011-216986

(51) Int. Cl.
*G02B 7/02*    (2006.01)
*G02B 13/00*    (2006.01)

(52) U.S. Cl.
CPC ........... *G02B 7/021* (2013.01); *Y10T 29/49826* (2015.01); *G02B 7/02* (2013.01); *G02B 13/0045* (2013.01)

(58) Field of Classification Search
CPC .................................. G02B 7/02; G02B 7/021
USPC .................................................. 359/811, 819
See application file for complete search history.

(56) References Cited

U.S. PATENT DOCUMENTS

2003/0016454 A1    1/2003    Yamaguchi et al.
2011/0063739 A1    3/2011    Hirata et al.

FOREIGN PATENT DOCUMENTS

| JP | 10-332985 | 12/1998 |
| JP | 2002-341218 | 11/2002 |
| JP | 2007-292845 | 11/2007 |
| JP | 2009-282264 | 12/2009 |

OTHER PUBLICATIONS

International Preliminary Report on Patentability dated Apr. 10, 2014 in corresponding International Application No. PCT/JP2012/073269.
International Search Report, PCT/JP2012/073269, Dec. 18, 2012.

*Primary Examiner* — William Choi
(74) *Attorney, Agent, or Firm* — Young & Thompson

(57) ABSTRACT

A holding frame of a lens unit has a frame main body of a cylindrical shape, which corresponds to the shapes of lenses. A protruding part is provided at a front end of the frame main body. The protruding part protrudes to the inside of the frame main body. The thickness of the protruding part is the same as that of a flange portion of a first lens. When the first lens is fitted into a space formed by the protruding part, a front surface of the flange portion of the first lens is flush with a front surface of the protruding part. A first light shielding film, which functions as an aperture stop, is affixed to at least one of the flange portion of the first lens and the front surface of the protruding part.

6 Claims, 11 Drawing Sheets

LENS UNIT AND METHOD FOR MANUFACTURING THE SAME

CROSS REFERENCE TO RELATED APPLICATIONS

This application is a continuation of PCT/JP2012/073269 filed on Sep. 12, 2012, which claims foreign priority to Japanese Application No. 2011-216986 filed on Sep. 30, 2011. The entire contents of each of the above applications are hereby incorporated by reference.

BACKGROUND OF THE INVENTION

1. Field of the Invention

The present invention relates to a lens unit in a camera module of a mobile electronic device and a method for manufacturing a lens unit.

2. Description Related to the Prior Art

There are mobile electronic devices such as mobile phones and mobile personal computers which comprise camera functions. A camera module used in the mobile electronic device is composed of an image sensor for capturing a subject image, a lens unit for forming the subject image on the image sensor, a signal processing circuit for processing an image signal from the image sensor, a flexible wiring substrate for electrically connecting the image sensor and the signal processing circuit, a connector for connecting the camera module to the electronic device and attached to an end of flexible wiring substrate, and a holder for holding these components integrally.

The lens unit comprises two or more lenses and a cylindrical lens holding frame for accommodating and holding each of the lenses (see Japanese Patent Laid-Open Publication No. 2009-282264). At the front end of the lens holding frame, a front surface plate is integrally formed with the lens holding frame. An opening, which is an aperture stop for a first lens, is formed in a center portion of the front surface plate. The first lens is inserted from the rear end of the lens holding frame. A front surface of a flange portion, which is integrally formed around the lens, comes in contact with a back side of the front surface plate, which is formed with the opening, of the lens holding frame. Thereby the position of the first lens is determined. From the second lens and on, the lens comes in contact with the flange portion of the lens which is previously inserted into the lens holding frame. Thus the positions of the lenses are determined in order. After the positioning, each lens is adhered to and held by the lens holding frame.

In this configuration, each lens is incorporated into the lens holding frame, so that the optical axis adjustment of the lens unit is difficult. In the Japanese Patent Laid-Open Publication No. 2009-282264, the first lens is attached from the front end side of the lens holding frame, after the second and subsequent lenses are inserted from the rear end side and held by the lens holding frame as in the conventional lens unit.

In the Japanese Patent Laid-Open Publication No. 2009-282264, the optical axis adjustment is performed by moving the first lens, which has a significant impact on the optical axis adjustment, along a surface which is orthogonal to the optical axis and fixing the first lens to a position for maximizing an MTF, at the time the first lens is adhered to the lens holding frame. Thereby the optical axis adjustment of the lens unit is performed promptly and easily. The manufacturing time of the lens unit is reduced.

It is desirable to reduce the thickness of the lens unit in the camera module incorporated in the mobile electronic device, which is particularly in need of reducing the thickness. It is desired to reduce the thickness of the lens unit in the optical axis direction as much as possible. In the Japanese Patent Laid-Open Publication No. 2009-282264, a disc-like lid formed with an opening, which functions as an aperture stop, at its center is placed on the first lens after the first lens is attached to the lens holding frame. The thickness of the lid hinders the reduction of the thickness of the lens unit. The disclosed lens unit is inadequate for use in the camera module in the mobile electronic device.

SUMMARY OF THE INVENTION

An object of the present invention is to provide a lens unit for allowing easy optical axis adjustment and reduction in thickness and a method for manufacturing the same.

The lens unit of the present invention has a first lens, a second lens, a holding frame for holding the first and second lenses, and a light shielding film, being an aperture stop for the first lens. Each of the first and second lenses has a disc-like shape and comprises a lens body portion formed with an optical lens surface and a ring-like flange portion surrounding the lens body portion. A diameter of the second lens is greater than a diameter of the first lens. The holding frame for holding the first and second lenses comprises a cylindrically-shaped frame main body and a protruding part. The frame main body has an inner diameter corresponding to a diameter of the second lens. The protruding part is provided at a front end portion of the frame main body and protrudes inward. A frame opening with a diameter greater than the diameter of the first lens and smaller than the diameter of the second lens is formed in a center portion of the protruding part. The thickness of the protruding part in an optical axis direction and the thickness of the flange portion of the first lens are the same. The second lens is inserted into the frame main body from a rear end side. The flange portion of the second lens abuts on the protruding part. The first lens is fitted into a space surrounded by the frame opening, from a front end side of the frame main body. Thereby a front surface of the flange portion of the first lens is flush with a front surface of the protruding part, and the holding frame holds the first and the second lenses in a state that the first and the second lenses are stacked in the optical axis direction. A light shielding film, being a thin film with light-shielding properties comprises an aperture in its center portion. The light shielding film is affixed to at least one of the flange portion of the first lens and a front surface of the protruding part, which are flush with each other. The aperture partially exposes the lens body portion of the first lens including the optical axis. An amount of light incident on the first lens is restricted by the light shielding film.

It is preferable that the front surface of the flange portion of the first lens and the front surface of the protruding part provided in the frame main body, which are flush with each other, are in a plane orthogonal to the optical axis of the lens. It is preferable to provide an adhesion recess into which an adhesive is poured and a jig recess into which apart of a jig is inserted, close to the frame opening formed in the protruding part. The jig is used for fitting the first lens into the space surrounded by the frame opening. In this case, it is preferable that the light shielding film covers each of the recesses simultaneously when the light shielding film is affixed to cover the flange portion of the first lens.

In manufacturing the above-described lens unit, a step for holding the second lens by the holding frame, a step for holding the first lens by the holding frame, and a step for affixing the light shielding film are performed sequentially. In the step for holding the second lens by the holding frame, the second lens is inserted into the frame main body from the rear end side and the flange portion of the second lens abuts on the protruding part. Thereby the second lens is held by the holding frame. In the step for holding the first lens by the holding frame, the first lens is fitted into the space surrounded by the frame opening, from the front end side of the frame main body. A back surface of the flange portion of the first lens abuts on the front surface of the flange portion of the second lens. The front surface of the flange portion of the first lens is flush with the front surface of the protruding part. Then, the first lens is held by the holding frame. In the step for affixing the light shielding film, the light shielding film is affixed to at least one of the front surface of the flange portion of the first lens and the front surface of the protruding part. Note that in a case where three or more lenses are used in the lens unit, third and subsequent lenses are inserted sequentially into the frame main body from the rear end side after the second lens is inserted into the frame main body from the rear end side and thereby the lenses are held.

In the step for holding the first lens by the holding frame, it is preferable to combine a step for evaluating an image formed through the lenses and the first lens is held at the position for optimizing the optical performance. In the step for evaluating the image formed through the lenses, examination light is incident on the first lens while the first lens is shifted in the direction orthogonal to the optical axis after the motion of the first lens in the optical axis direction is inhibited by the contact between the back surface of the flange portion of the first lens and the front surface of the flange portion of the second lens. Thereby the image formed through the lenses is evaluated. In the step for evaluating the image-forming properties, the light shielding film has not been affixed yet. Hence, in the step for evaluating the image-forming properties, it is preferable that the jig has a function to restrict an amount of light incident on the first lens and thereby the evaluation is performed under the same conditions as those in the case in which the light shielding film is affixed.

In the present invention, the flange portion of the first lens is flush with the front surface of the protruding part provided in the frame main body. The thin light shielding film is affixed to at least one of the flange portion of the first lens and the front surface of the protruding part. When compared with the conventional case in which a plate-like lid is attached, the thickness of the lens unit is reduced by eliminating the thickness of the plate-like lid. The protruding part is provided at the front end of the frame main body, to position the second lens in the optical axis direction. The frame opening is formed in the protruding part. With the use of the space surrounded by the frame opening, the first lens is shifted in the direction orthogonal to the optical axis and thus the optical axis adjustment is performed. The optical axis adjustment function does not make the structure of the lens unit complicated and does not hinder the reduction in thickness.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
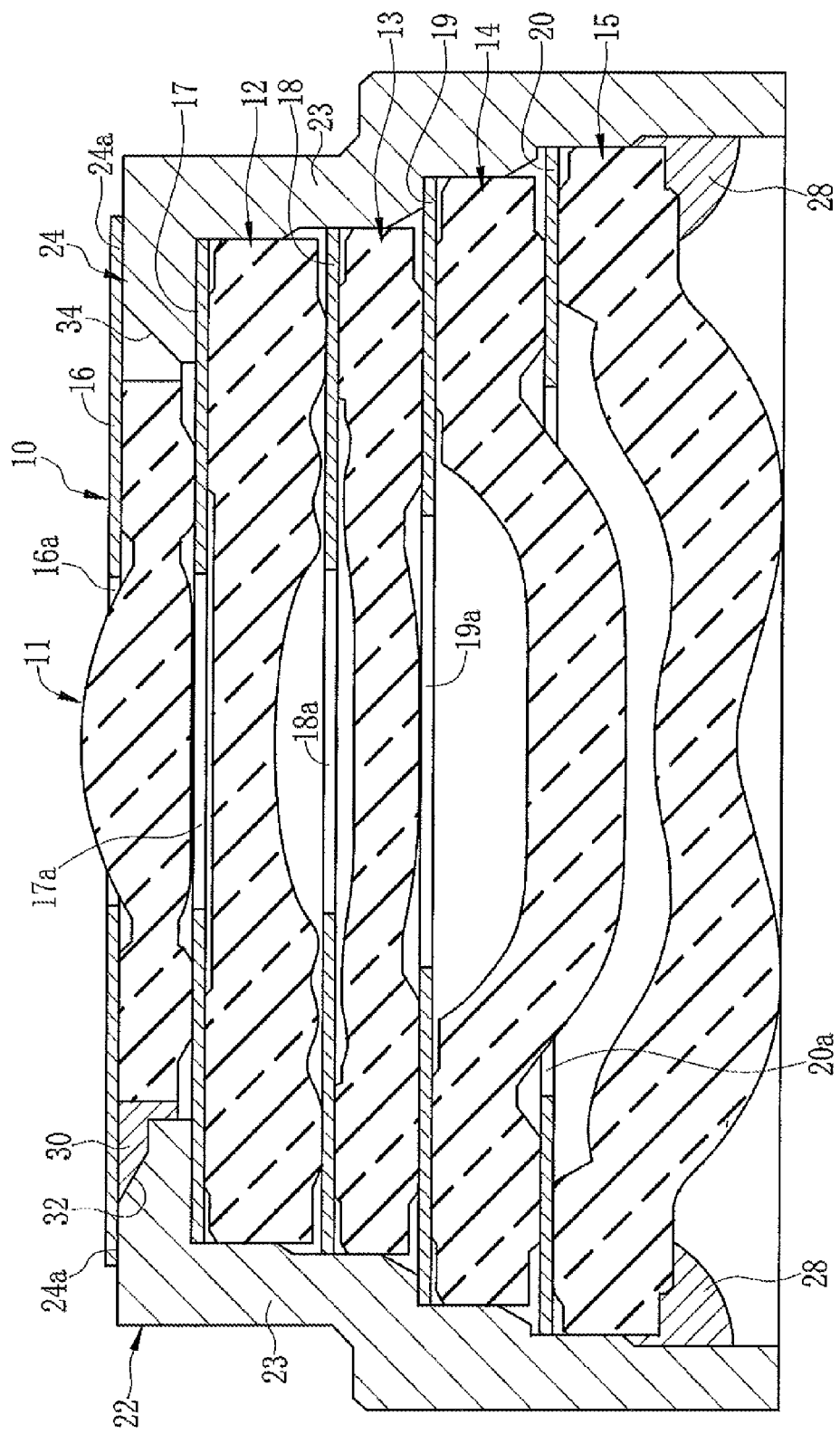
FIG. 1 is a cross-sectional view illustrating a lens unit.

As shown in FIG. 1, a lens unit 10 is composed of five lenses (first to fifth lenses) 11 to 15, five light shielding films (first to fifth light shielding films) 16 to 20, and a holding frame 22 for holding them. The lens unit 10 is used in a camera module of a mobile electronic device such as a mobile phone or a mobile personal computer. Optical properties of each of the lenses 11 to 15 are adjusted such that a subject image is formed on an image sensor of the camera module when the lens unit 10 is mounted on the camera module.

Each of the lenses 11 to 15 is formed into a disc-like (circular plate-like) shape. Each of the lenses 11 to 15 is formed such that the diameters of the lenses 11 to 15 decrease toward the lens on the light incident side (front side). In other words, the rearmost fifth lens 15 has the largest diameter and the first lens 11 has the smallest diameter, among the lenses 11 to 15. Note that the term "circle" as in the "circular plate-like shape" of each lens 11-15 does not necessarily represent a perfect circle. The "circle" may be an "ellipse" or a shape partially having a discontinuous portion.

Figure 2:
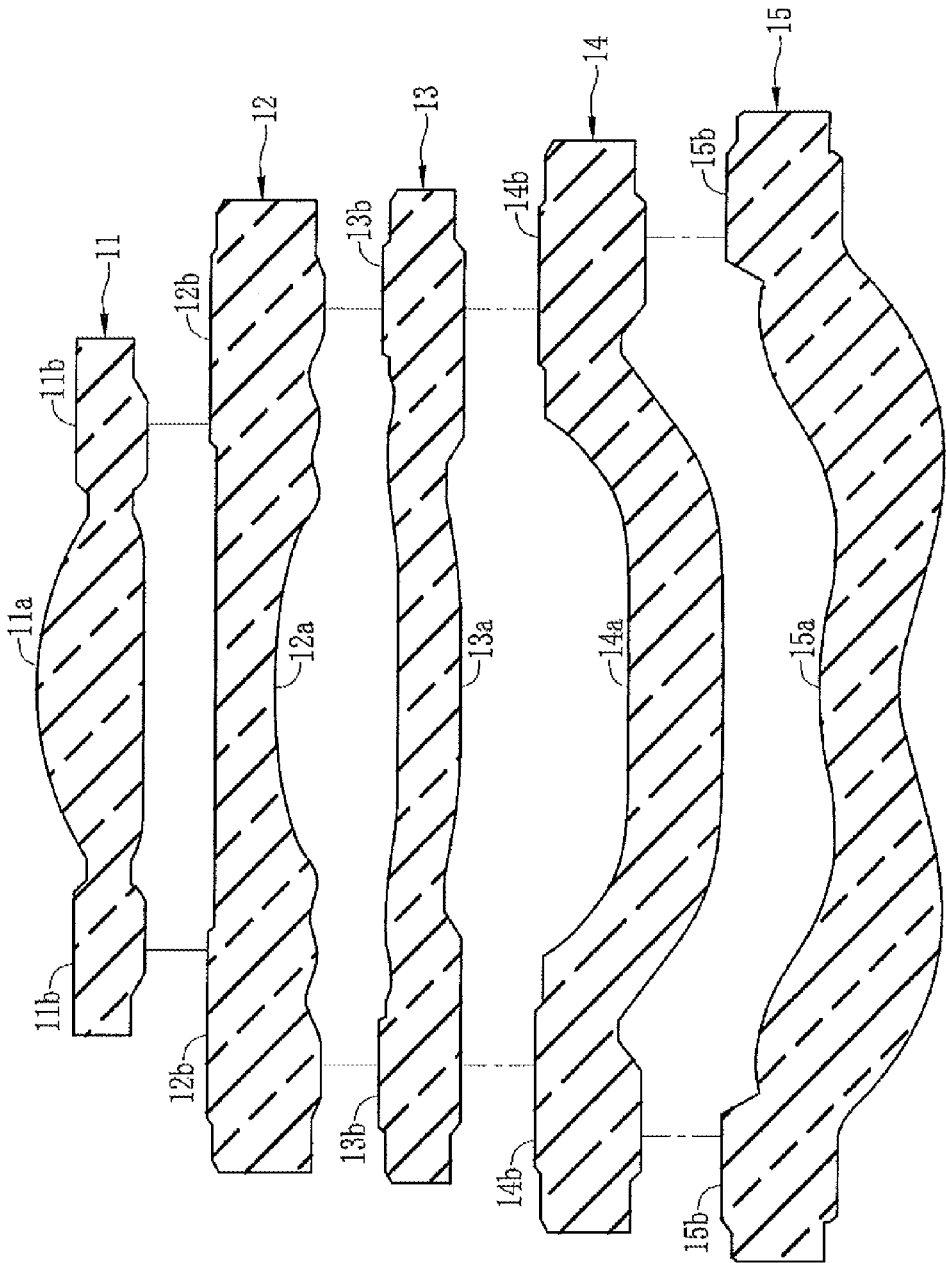
FIG. 2 is an explanatory view illustrating each lens.

As shown in FIG. 2, the lenses 11 to 15 have lens body portions 11a to 15a and ring-like flange portions 11b to 15b, respectively. The lens body portions 11a to 15a are formed with lens surfaces having predetermined optical properties, respectively. The ring-like flange portions 11b to 15b are formed around the lens body portions 11a to 15a, respectively. The flange portions 11b to 15b allow the holding frame 22 to hold the respective lenses 11 to 15. A flat surface (the so-called flange surface) which is orthogonal to an optical axis is formed on each of the light incident side (front side) and light exit side (back side) of each of the flange portions 11b to 15b. The flat surface portions of the flange portions 11b to 15b of the lenses 11 to 15 come in contact with each other, and thereby each of the lenses 11 to 15 is positioned in an optical axis direction. Note that the flange surface may not be precisely orthogonal to the optical axis as long as there is no trouble in positioning and assembling the lenses.

The holding frame 22 has a cylindrical frame main body 23 with the size corresponding to the diameter of each of the lenses 11 to 15. The length of the frame main body 23 in an axial direction corresponds to the height of the lenses 11 to 15 stacked in the optical axis direction. The holding frame 22 holds each of the lenses 11 to 15 such that the lenses 11 to 15 are stacked in the optical axis direction inside the frame main body 23.

Figure 3:
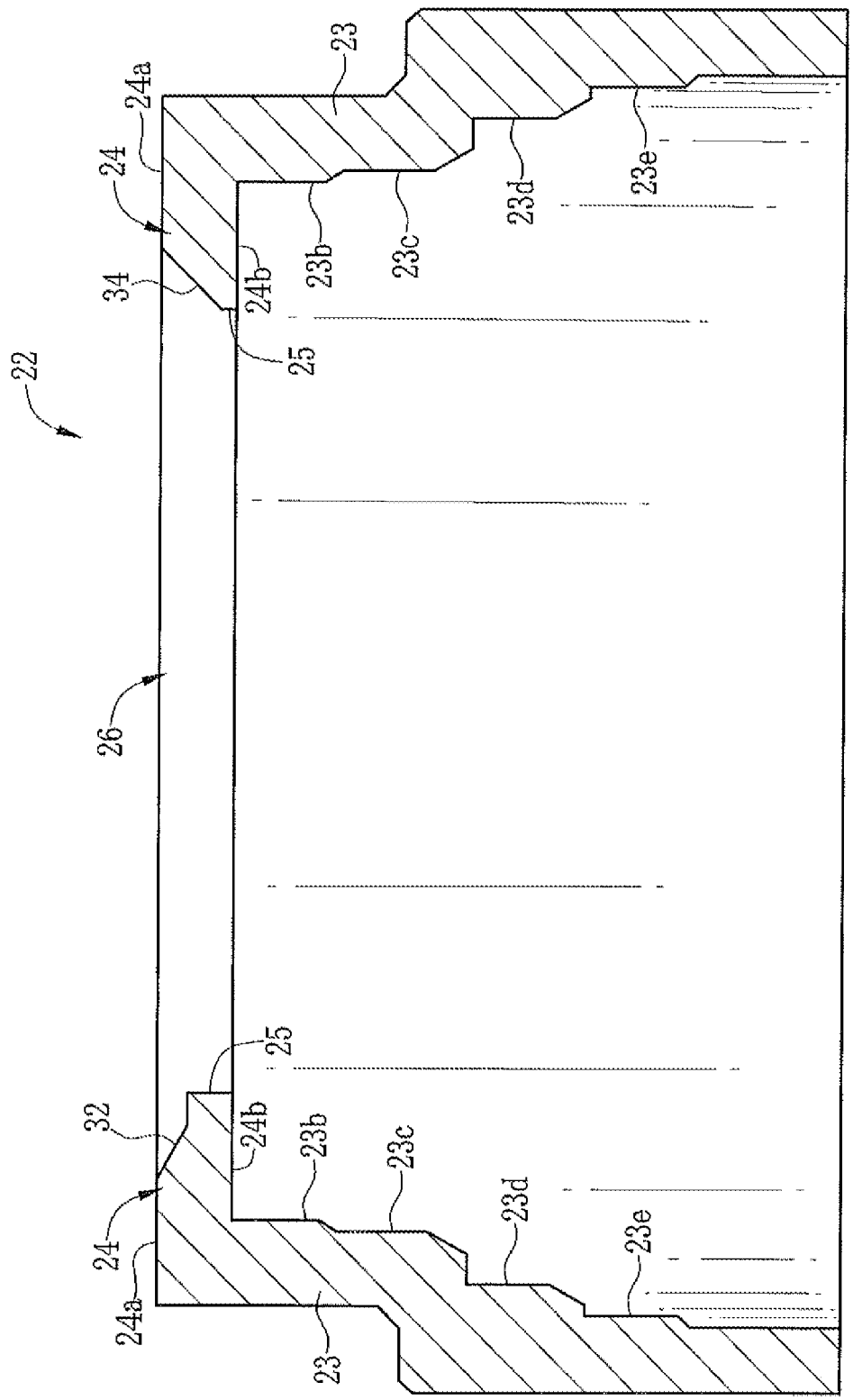
FIG. 3 is an explanatory view of a holding frame.

As shown in FIGS. 1 and 3, a protruding part 24 is provided at a front end portion (an end portion on the light incident side) of the frame main body 23. The protruding part 24 protrudes from the cylindrical frame main body 23 to the inside (the center of the cylinder) such that a diameter of an opening is reduced. A circular frame opening 25, which is smaller than the inner diameter of the frame main body 23, is formed in the center portion of the protruding part 24. The diameter of the frame opening 25 is slightly greater than that of the first lens 11 and smaller than that of the second lens 12.

The protruding part 24 has a plate-like shape of the same thickness as that of the flange portion 11b of the first lens 11. Thereby a space 26 is formed in the center portion of the protruding part 24. The thickness of the space 26 from a front surface 24a of the protruding part 24 is the same as that of the flange portion 11b. The space 26 is surrounded by an inner circumferential wall of the frame opening 25. The holding frame 22 holds the first lens 11 such that the first lens 11 is fitted into the space 26. The protruding part 24 protrudes in a direction orthogonal to the optical axis of each of the lenses 11 to 15. The front surface 24a and a back surface 24b are flat surfaces each of which is orthogonal to the optical axis. Note that the thickness of the protruding part 24 in the optical axis direction and the thickness of the flange portion 11b are regarded as the same in a case where a difference between them is within a range in the order of 0.5 mm.

The first light shielding film 16 has a circular shape with a diameter slightly smaller than that of the front end of the holding frame 22. A material with light shielding properties is used in the first light shielding film 16. A circular aperture 16a is formed at the center of the first light shielding film 16. The circular aperture 16a corresponds to the lens body portion 11a of the first lens 11.

The first light shielding film 16 is affixed over the first lens 11 in a state that the center of the aperture 16a is coincident with the optical axis of the first lens 11. Thereby, the first light shielding film 16 covers the flange portion 11b of the first lens 11 and functions as an aperture stop for allowing light of a desired light amount to be incident only on the lens body portion 11a of the first lens 11.

The second light shielding film 17 has a circular shape with the same diameter as that of the second lens 12. A material with light shielding properties is used in the second light shielding film 17. A circular aperture 17a is formed at the center of the second light shielding film 17. The circular aperture 17a corresponds to the lens body portion 12a of the second lens 12.

The second light shielding film 17 is placed on the second lens 12. The second light shielding film 17 is disposed between the flange portion 12b of the second lens 12 and the back surface 24b of the protruding part 24. Thereby the second light shielding film 17 covers the flange portion 12b of the second lens 12 to avoid stray light which is caused by light incident on the flange portion 12b. Note that the diameter of the second light shielding film 17 and the diameter of the second lens 12 may not necessarily be precisely the same. The second light shielding film 17 needs to have the diameter which allows insertion of the second light shielding film 17 into the holding frame 22 and sufficiently avoids the incidence of light on the flange portion 12b.

The third light shielding film 18 has a circular shape with the same diameter as that of the third lens 13. A circular aperture 18a is formed at the center of the third light shielding film 18. The circular aperture 18a corresponds to the lens body portion 13a of the third lens 13. The fourth light shielding film 19 has a circular shape with the same diameter as that of the fourth lens 14. A circular aperture 19a is formed at the center of the fourth light shielding film 19. The circular aperture 19a corresponds to the lens body portion 14a of the fourth lens 14. The fifth light shielding film 20 has a circular shape with the same diameter as that of the fifth lens 15. A circular aperture 20a is formed at the center of the fifth light shielding film 20. The circular aperture 20a corresponds to the lens body portion 15a of the fifth lens 15. Note that the diameters of the third to fifth light shielding films 18 to 20 are the same as those of the third to fifth lenses 13 to 15, respectively, in the same sense as previously described for the diameter of the second light shielding film 17.

Hereinafter, the compositions and functions of the third light shielding film 18, the fourth light shielding film 19, and the fifth light shielding film 20 are similar to those of the second light shielding film 17, so that the descriptions thereof are omitted. In each drawing, each of the light shielding films 16 to 20 is illustrated with thickness for the sake of convenience. Actually, each of the light shielding films 16 to 20 is an extremely thin film with the thickness in the order of several tens μm (preferably 20 to 50 μm).

As described above, the diameters of the lenses 11 to 15 decrease toward the light incident side. Hence, four step portions (first to fourth step portions) 23b to 23e are provided on inner surfaces of the frame main body 23 of the holding frame 22. Inner diameters of the first to fourth step portions 23b to 23e decrease toward the front end side (light incident side).

The inner diameter of the first step portion 23b, which is located on the frontmost side, is the same as the diameter of the second lens 12. The term "same" means that an outer circumferential surface of the second lens 12 can be fitted into and in contact with an inner circumferential surface of the step portion 23b in a case where the second lens 12 is inserted. This applies to the second to fourth step portions 23c to 23e in a similar manner. The second lens 12 is inserted into the frame main body 23 from the rear end side of the frame main body 23 and fitted into the first step portion 23b. Thereby the position of the second lens 12 in the direction orthogonal to the optical axis is determined. In that state, the front surface of the flange portion 12b comes in contact with the second light shielding film 17, and the front surface of the flange portion 12b abuts on the back surface 24b of the protruding part 24 through the second light shielding film 17. Thereby the position of the second lens 12 in the optical axis direction is determined. The holding frame 22 holds the second lens 12 in the position thus determined.

An inner diameter of the second step portion 23c is the same as the diameter of the third lens 13. The third lens 13 is inserted into the frame main body 23 from the rear end side of the frame main body 23 and fitted into the second step portion 23c. Thereby a position of the third lens 13 in the direction orthogonal to the optical axis is determined. In that state, the front surface of the flange portion 13b comes in contact with the third light shielding film 18, and the flange portion 13b abuts on the back surface of the flange portion 12b of the second lens 12 through the third light shielding film 18. Thereby the position of the third lens 13 in the optical axis direction is determined. The holding frame 22 holds the third lens 13 in the position thus determined and in a state that the third lens 13 is stacked behind the second lens 12.

An inner diameter of the third step portion 23d is the same as the diameter of the fourth lens 14. An inner diameter of the fourth step portion 23e is the same as the diameter of the fifth lens 15. Positions of the fourth lens 14 and the fifth lens 15 are determined in procedures similar to that of the third lens 13. The fourth lens 14 and the fifth lens 15 are stacked in the optical axis direction and held by the holding frame 22.

After the second to fifth lenses 12 to 15 are held by the holding frame 22 as described above, an adhesive 28 is applied to a contact portion between the back surface (light exit side surface) of the flange portion 15b of the fifth lens 15 and the inner surface of the frame main body 23. Thereby the adhesive 28 prevents the second to fifth lenses 12 to 15 from slipping off from the frame main body 23 and fixes the second to fifth lenses 12 to 15 to the holding frame 22. For example, an ultraviolet-curable type resin adhesive may be used as the adhesive 28.

Figure 4:
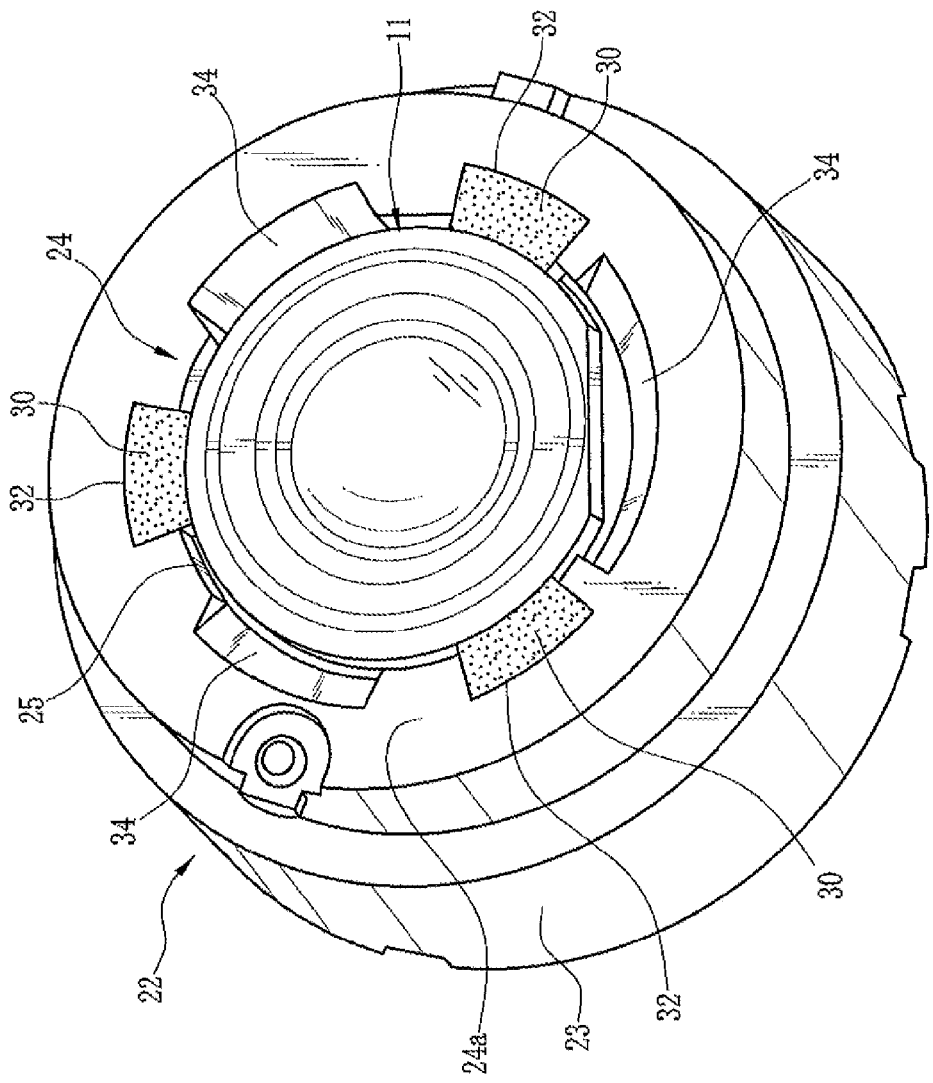
FIG. 4 is a perspective view of the holding frame.

As shown in FIGS. 3 and 4, adhesion recesses 32 and jig recesses 34 are provided in an inner circumferential wall for forming the frame opening 25. An adhesive 30 for holding the first lens 11 is poured into the adhesion recess 32. A part of a jig 40 (see FIG. 6) is inserted into the jig recess 34 when the positioning of the first lens 11 is performed. The adhesion recess 32 and the jig recess 34 are disposed to face each other. For example, the three adhesion recesses 32 are provided at 120-degree intervals, and the three jig recesses 34 are provided at 120-degree intervals. Note that the ultraviolet-curable type resin adhesive or the like may be used as the adhesive 30, as in the case of the adhesive 28.

After the second to fifth lenses 12 to 15 are held by the holding frame 22, the first lens 11 is attached to the holding frame 22 from the front end side of the frame main body 23 such that the first lens 11 is fitted into the space 26. The thickness of the protruding part 24 is the same as that of the flange portion 11b of the first lens 11. When the first lens 11 is fitted into the space 26 and the back surface of the flange portion 11b of the first lens 11 abuts on the front surface of the flange portion 12b of the second lens 12 through the second light shielding film 17, the front surface of the flange portion 11b of the first lens 11 is flush with the front surface 24a of the protruding part 24 that is integral with the frame main body 23. The term "flush with" means that the front surface of the flange portion 11b and the front surface 24a of the protruding part 24 align at the same level. However, they may not necessarily be at the same level. A difference in level in the order of 0.5 mm is allowed without any problems.

In the lens unit 10, after the first lens 11 is fitted into the space 26, the position of the first lens 11 is adjusted in a direction orthogonal to the optical axis. Thereby, the optical axis adjustment of the first lens 11 is performed relative to the second to fifth lenses 12 to 15. The optical axis adjustment is performed by measuring optical properties (MTF characteristics or the like) of an image, which is formed by the lenses 11 to 15, with the use of an inspection image sensor, a resolution chart, or the like, while the first lens 11 is shifted in the direction orthogonal to the optical axis inside the space 26. The diameter of the space 26 is slightly greater than that of the first lens 11. The position of the first lens 11 is determined so as to make the optical properties favorable or maximum.

After the positioning, the adhesive 30 is poured into each of the adhesion recesses 32 to fix the first lens 11 to the holding frame 22. Thereby the first lens 11 is held by the holding frame 22 in a state that the optical axis of each of the lenses 11 to 15 is adjusted. Note that an amount of the adhesive 30 is specified to prevent protrusion of the adhesive 30 from the front surface 24a of the protruding part 24 after the solidification.

Figure 5:
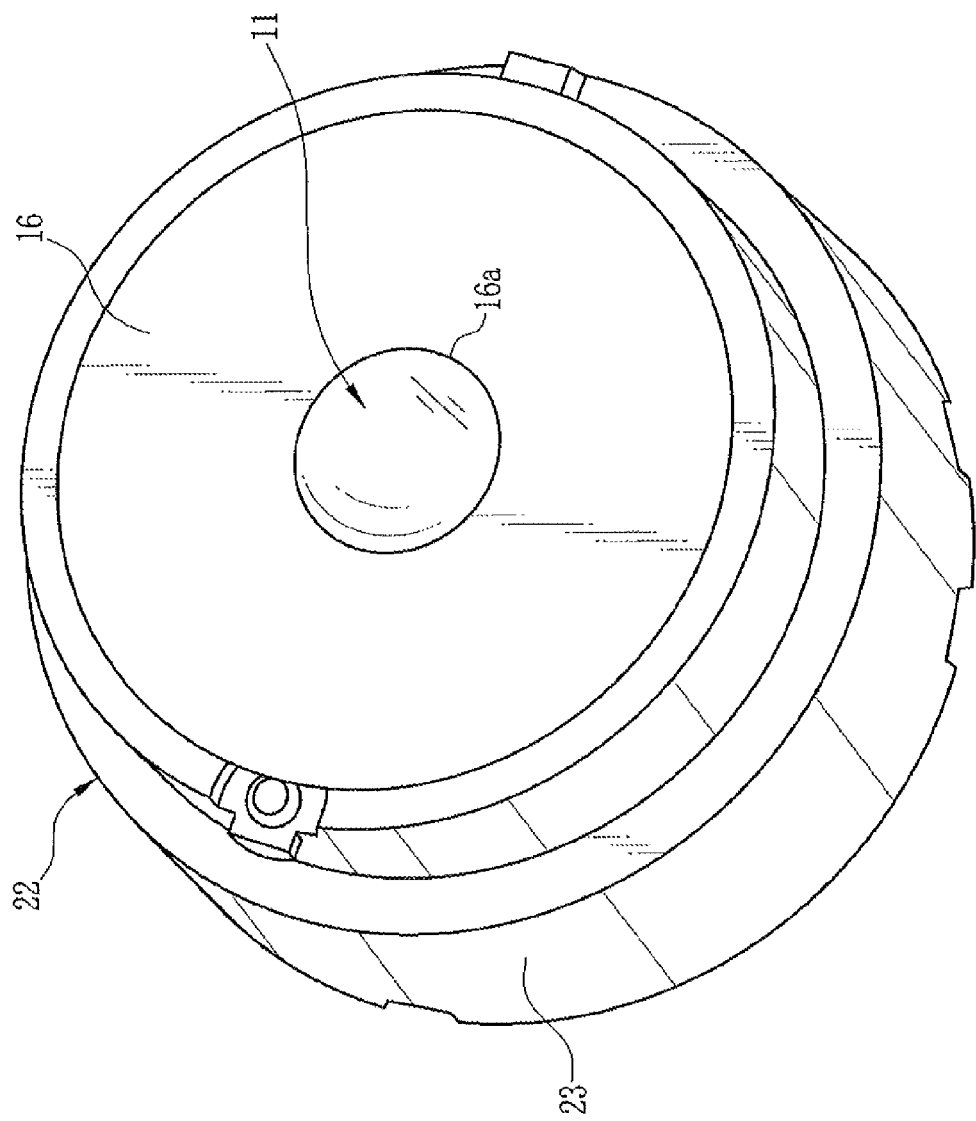
FIG. 5 is a perspective view illustrating a state in which a first light shielding film is affixed.

The first light shielding film 16 is affixed to the first lens 11 after the first lens 11 is held by the holding frame 22. The first light shielding film 16 has the circular shape with the diameter slightly smaller than that of the front end of the holding frame 22. Hence, as shown in FIGS. 1 and 5, the first light shielding film 16 is placed to be in contact with both of the light incident side surface (front surface) of the flange portion 11b of the first lens 11 and the front surface 24a of the protruding part 24, which are flush with each other. The first light shielding film 16 is affixed to the frame main body 23 with an adhesive applied to the front surface 24a.

The first light shielding film 16 covers the front surface of the flange portion 11b of the first lens 11 and also covers each of the recesses 32 and 34 that appear on the front surface 24a of the protruding part 24. Thereby the first light shielding film 16 prevents unnecessary light from entering each of the recesses 32 and 34. Note that the first light shielding film 16 may be affixed only to the light incident side surface of the flange portion 11b. The first light shielding film 16 may be affixed to both of the light incident side surface of the flange portion 11b and the front surface 24a.

The light incident side surface of the flange portion 11b of the first lens 11 is flush with the front surface 24a of the protruding part 24 formed in the frame main body 23. The first light shielding film 16, which is a thin film-like member, is affixed across the light incident side surface of the flange portion 11b and the front surface 24a of the protruding part 24. Thereby the thickness of the lens unit 10 is reduced by the thickness of the plate (lid), as compared with the conventional case in which a plate-like lid is attached. Thus the lens unit 10 is slimmed down. Even so, the optical axis adjustment of each of the lenses 11 to 15 is performed easily only by adjusting the position of the first lens 11 in the direction orthogonal to the optical axis.

Figure 6:
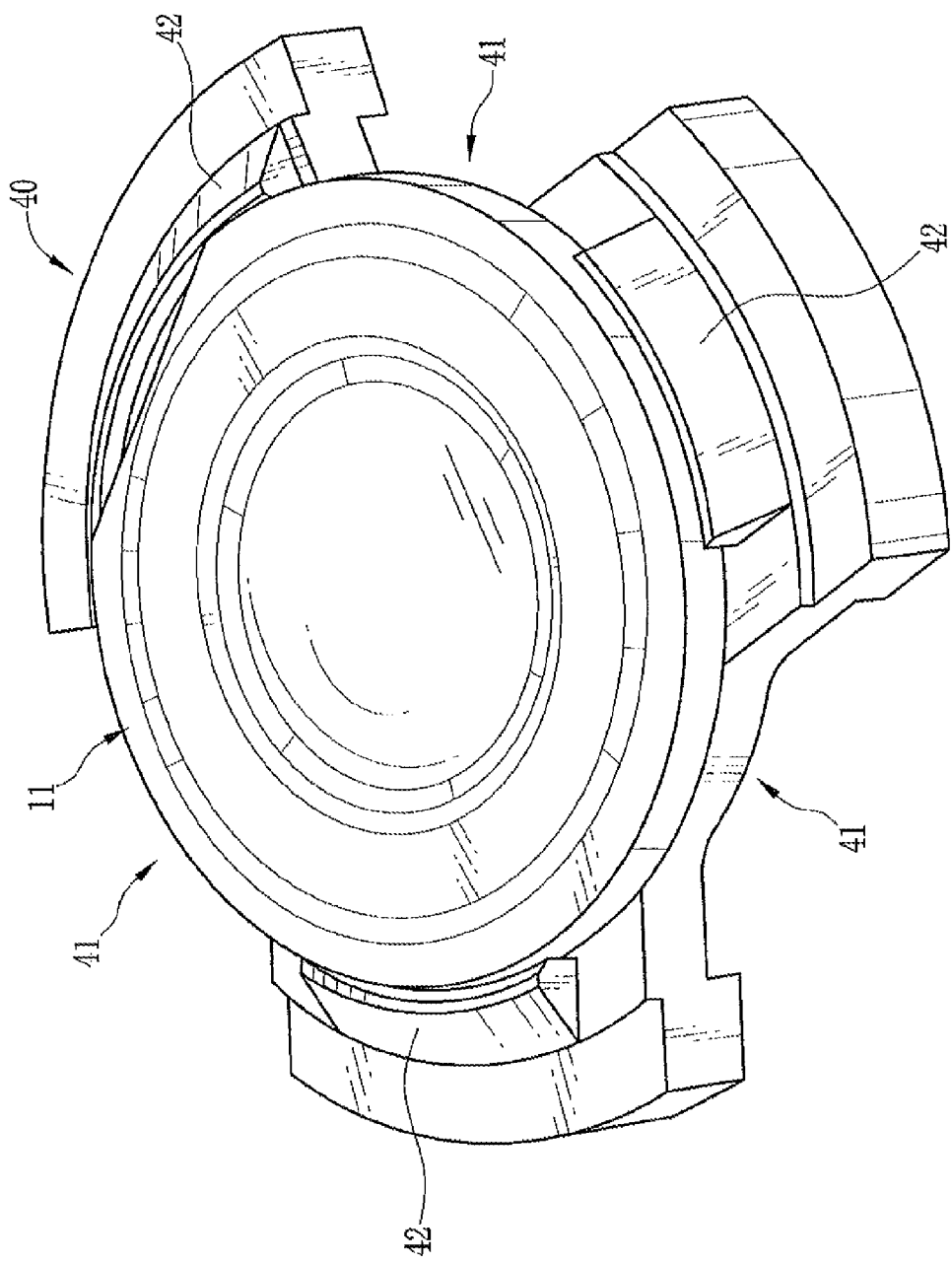
FIG. 6 is a perspective view illustrating a positioning jig.

The positioning jig 40 shown in FIG. 6 is used for positioning the first lens 11. The positioning jig 40 is a circular plate with three triangular cutouts 41. Each cutout 41 is provided at a 120-degree interval. Three claw portions for holding the first lens 11 are provided on one of the surfaces of the positioning jig 40.

Each claw portion 42 is provided on a portion not formed with the cutout 41. The claw portions 42 are provided at 120-degree intervals in positions opposing the cutouts 41, respectively. The position and the shape of each claw portion 42 correspond to the position and the shape of each jig recess 34 formed in the holding frame 22. The claw portions 42 are formed to fit in the jig recesses 34, respectively. The height of each claw portion 42 is lower than the thickness of the flange portion 11b such that the flange portion 11b slightly protrudes from each claw portion 42 when the first lens 11 is held by the claw portions 42.

The amount of the cutout from the side end surface of each cutout 41 is adjusted such that the first lens 11 held by the claw portions 42 is partially exposed when viewed from a surface opposite to the surface provided with the claw portions 42.

Figure 7:
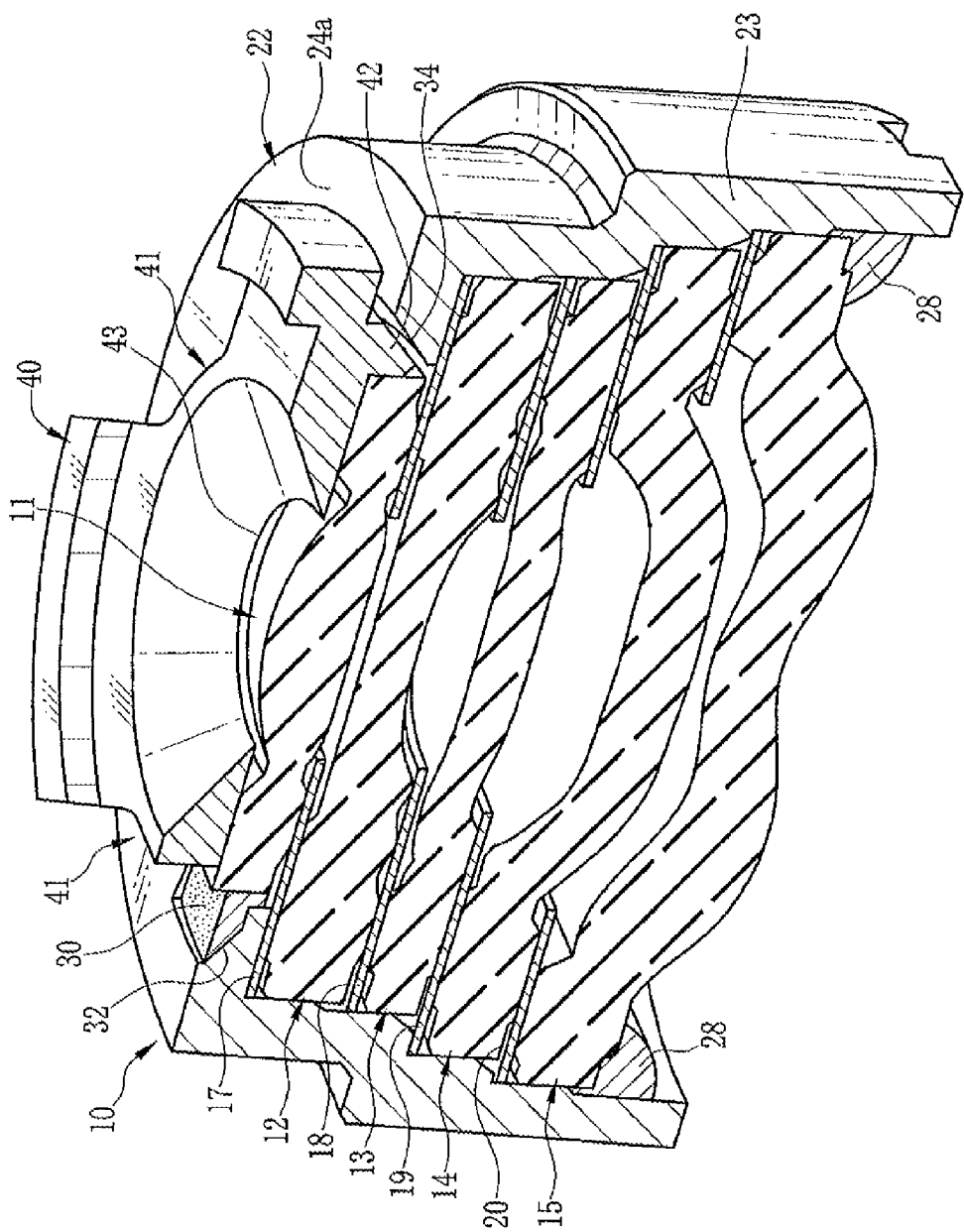
FIG. 7 is an explanatory view illustrating a state in which the positioning jig is placed on the holding frame.

As shown in FIG. 7, a circular opening 43 is formed at the center of the positioning jig 40. The diameter of the opening 43 is the same as that of the aperture 16a of the first light shielding film 16. Thereby the positioning jig 40 allows the same amount of light as that allowed in the case in which the first light shielding film 16 is affixed, to enter the first lens 11.

In positioning the first lens 11, first, the claw portions 42 hold the first lens 11 with the light exit side surface facing outward. Thereafter, as shown in FIG. 7, the positions are adjusted such that the claw portions 42 fit in the respective jig recesses 34. Thus the positioning jig 40 is placed on the holding frame 22 which holds the second to fifth lenses 12 to 15.

When the positioning jig 40 is placed on the holding frame 22 as described above, the claw portions 42 fit in the respective jig recesses 34, and thus the first lens 11 is fitted into the space 26. At this time, the flange portion 11b of the first lens 11 is slightly protruded from each claw portion 42, so that the flange portion 11b comes in contact with the second light shielding film 17. Due to the weight of the positioning jig 40, the flange portion 11b abuts on the flange portion 12b of the second lens 12 through the second light shielding film 17.

The cutouts 41 are provided in positions opposing the claw portions 42, respectively. The adhesion recesses 32 of the protruding part 24 are provided in positions opposing the jig recesses 34, respectively. Hence, the adhesion recesses 32 are exposed through the respective cutouts 41 when the positioning jig 40 is placed on the holding frame 22.

After the first lens 11 and the positioning jig 40 are placed on the holding frame 22, the first lens 11 and the positioning jig 40 are shifted while the optical properties of an image formed by the lenses 11 to 15 are measured. Thereby the position of the first lens 11 at which favorable optical properties are achieved is determined.

It is difficult to move the first lens 11 in the direction orthogonal to the optical axis without using the positioning jig 40 because the first lens cannot be grasped when the first lens 11 is fitted into the space 26. In the case where the positioning jig 40 is used, portions of the positioning jig 40 other than the claw portions 42 protrude outward from the holding frame 22, so that the first lens 11 is easily shifted by holding the positioning jig 40.

When the positioning jig 40 is used, the same amount of light as that in the case where the first light shielding film 16 is affixed is incident on the first lens 11 through the opening 43. Thereby the accuracy of the measurement of the optical properties is improved as compared with the case without the positioning jig 40. Furthermore, each adhesion recess 32 is exposed through each cutout 41, so that the positioning jig 40 does not hinder the adhesion.

As described above, with the use of the positioning jig 40, the first lens 11 abuts on the second lens 12 due to the weight of the positioning jig 40 and the first lens 11 is easily shifted after the first lens 11 is fitted into the space 26. Furthermore, the same amount of light as that allowed by the first light shielding film 16 is incident on the first lens 11. The adhesion is performed with the position of the first lens 11 adjusted. Thus, the positioning of the first lens 11 in the direction orthogonal to the optical axis is performed easily and appropriately.

Figure 8:
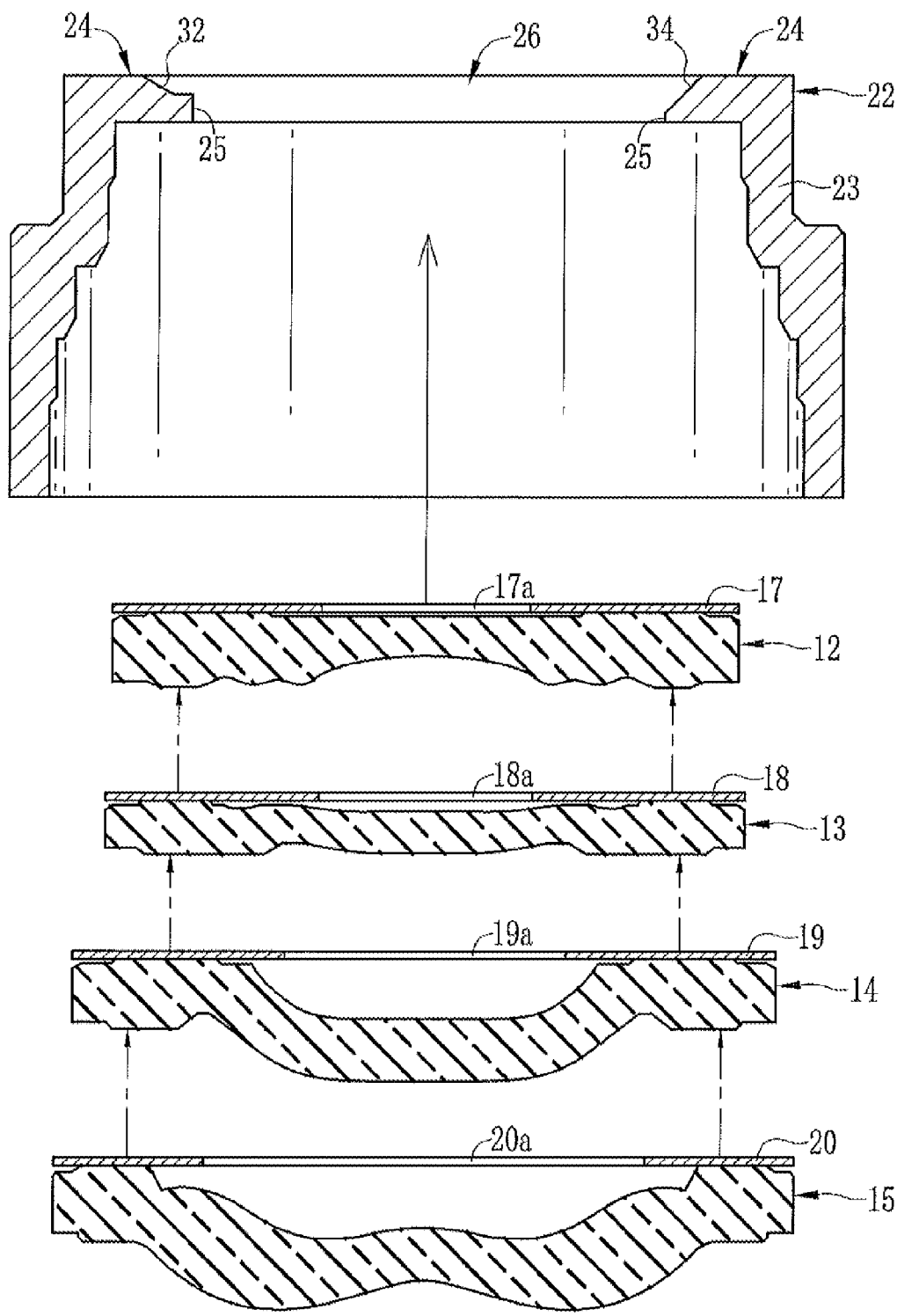
FIG. 8 is an explanatory view illustrating a procedure for allowing the holding frame to hold second to fifth lenses.

Next, a method for manufacturing the lens unit 10 of the above-described configuration is described. In manufacturing the lens unit 10, first, as shown in FIG. 8, the second lens 12 on which the second light shielding film 17 is placed, the third lens 13 on which the third light shielding film 18 is placed, the fourth lens 14 on which the fourth light shielding film 19 is placed, and the fifth lens 15 on which the fifth light shielding film 20 is placed are inserted in this order into the frame main body 23 from the rear end side. Thus the holding frame 22 holds each of the lenses 12 to 15 and the light shielding films 17 to 20. Note that the light shielding films 17 to 20 may be affixed to the respective lenses 12 to 15, instead of just being sandwiched.

Figure 9:
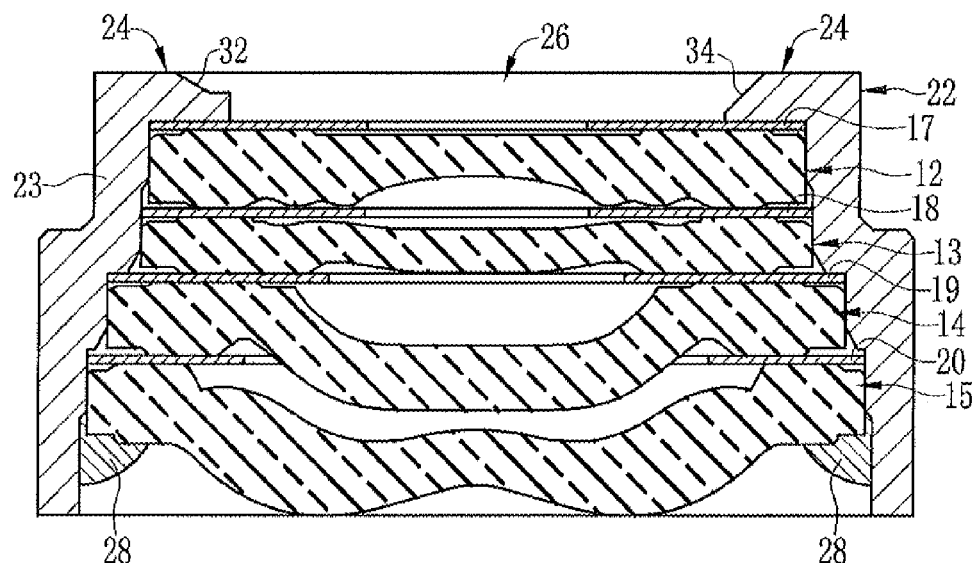
FIG. 9 is an explanatory view illustrating a procedure for applying an adhesive to the fifth lens.

After each of the lenses 12 to 15 and the light shielding films 17 to 20 is held by the holding frame 22, the adhesive 28 is applied a contact portion between the light exit side surface of the flange portion 15b of the fifth lens 15 and the inner surface of the frame main body 23 as shown in FIG. 9. Thus the lenses 12 to 15 and the light shielding films 17 to 20 are fixed to the holding frame 22.

Figure 10:
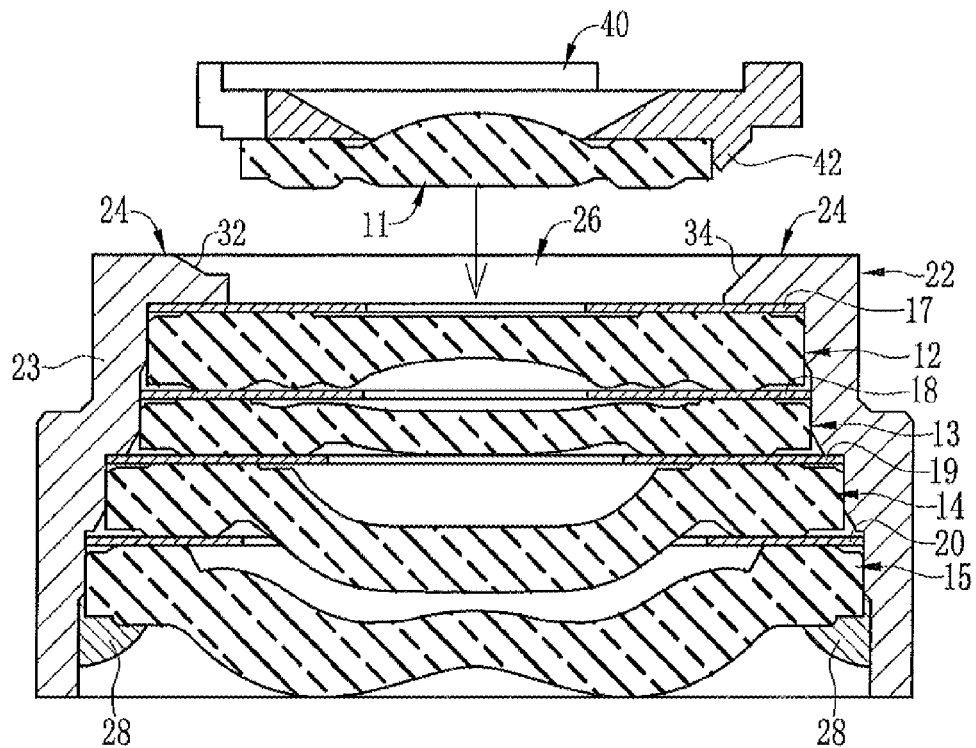
FIG. 10 is an explanatory view illustrating a procedure to place the positioning jig which holds the first lens on the holding frame.
Figure 11:
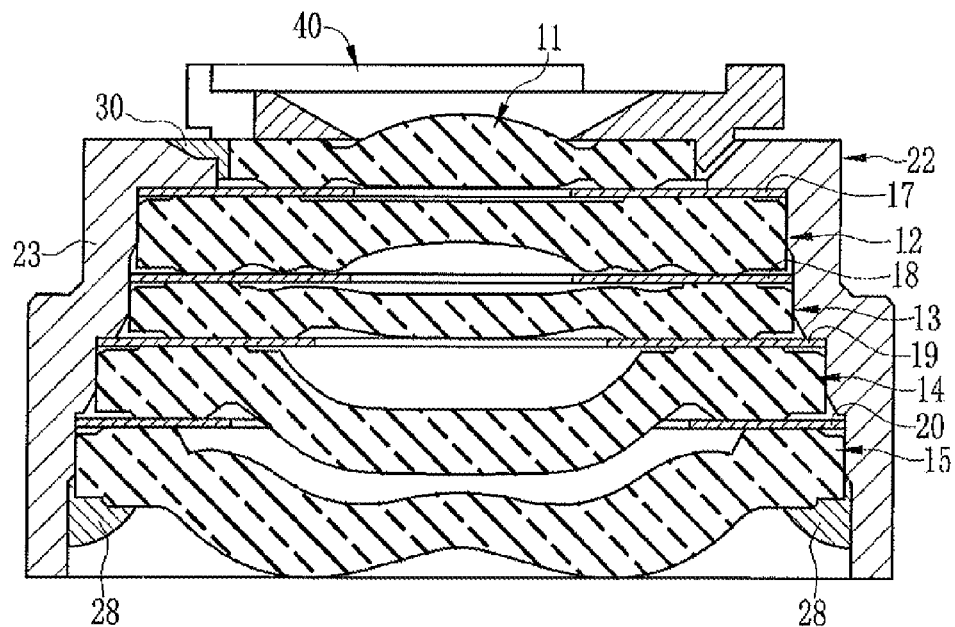
FIG. 11 is an explanatory view illustrating a procedure for adhesion of the first lens.

After the adhesive 28 is applied and each portion is fixed, the claw portions 42 of the positioning jig 40 hold the first lens 11 with the light exit side surface facing outward as shown in FIG. 10. The positions of the claw portions 42 are adjusted to be fitted into the respective jig recesses 34, and the first lens 11 and the positioning jig 40 are placed on the holding frame 22 which holds the lenses 12 to 15. Then, the first lens 11 and the positioning jig 40 are shifted while the optical properties of the image formed by the lenses 11 to 15 are measured as described above. Thus the position of the first lens 11 at which the optical properties are favorable or at the maximum is determined.

After the position of the first lens 11 is determined, the adhesive 30 is poured into each adhesion recess 32 through the corresponding cutout 41 of the positioning jig 40 while the first lens 11 is held by the positioning jig 40 so as not to be shifted from the determined position. Thereby the first lens 11 is fixed to the holding frame 22.

Figure 12:
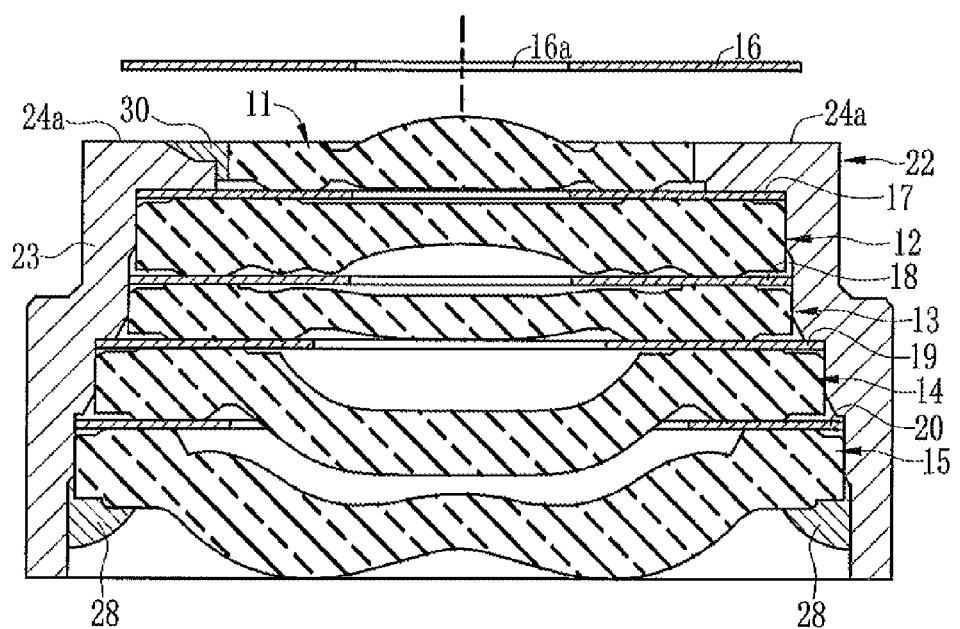
FIG. 12 is an explanatory view illustrating a procedure for affixing the first light shielding film.

After it is checked that the adhesive 30 is hardened and the first lens 11 is securely fixed to the holding frame 22, the positioning jig 40 is removed from the first lens 11. Then, as shown in FIG. 12, the position of the first light shielding film 16 is adjusted such that the optical axis of the first lens 11 is coincident with the center of the aperture 16a of the first light shielding film 16. The first light shielding film 16 is placed to come in contact with both of the light incident side surface of the flange portion 11b of the first lens 11 and the front surface 24a of the protruding part 24, which are flush with each other. Thereafter, the adhesive is applied to the front surface 24a to affix the first light shielding film 16 to the front surface 24a. Thereby the lens unit 10 is completed.

Figure 13:
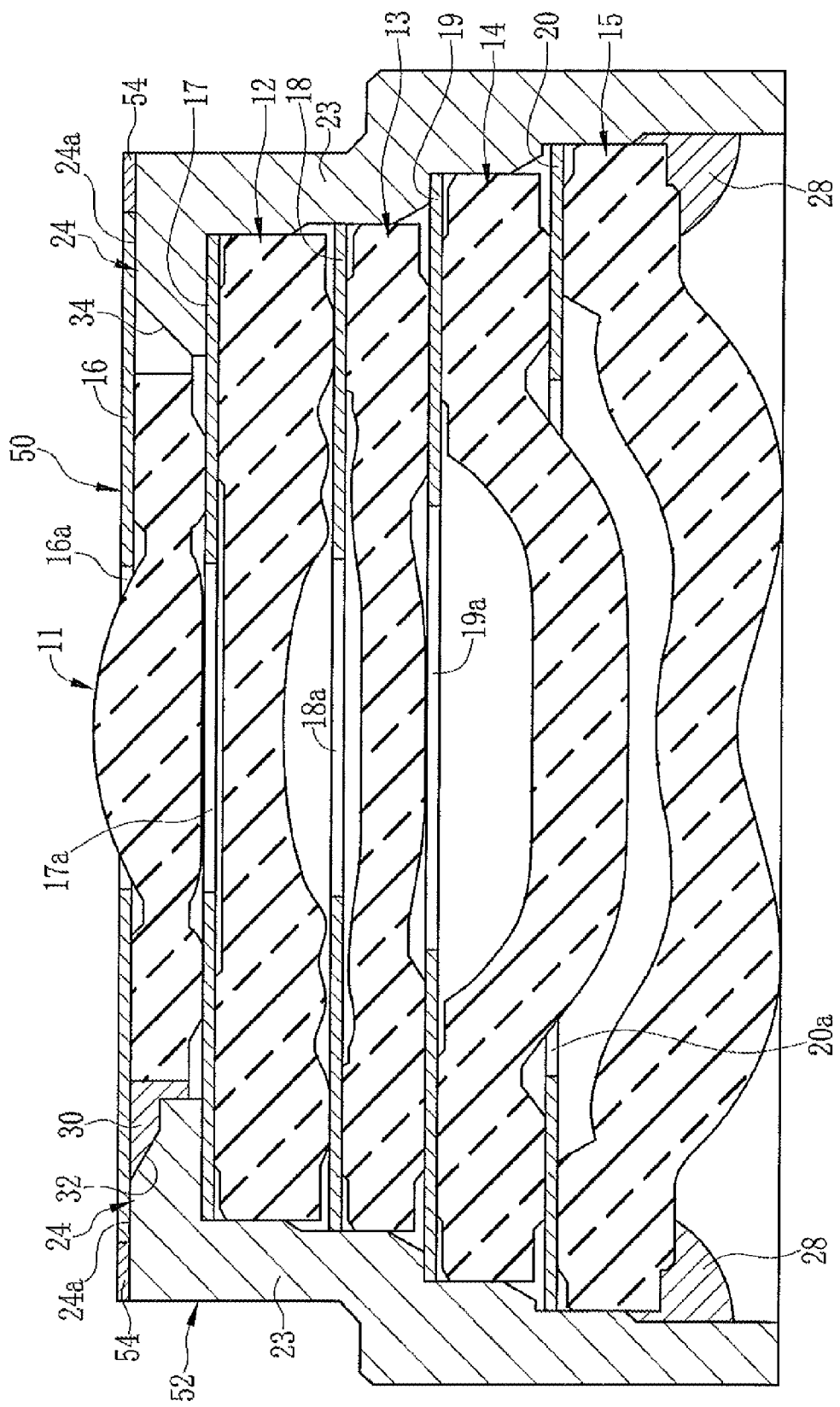
FIG. 13 is a cross-sectional view illustrating an example in which a protrusion for positioning the first light shielding film is provided on the holding frame.

In the above embodiments, the first light shielding film 16 is affixed to the front surface 24a of the protruding part 24, which is formed integrally with the frame main body 23. However, registration of the first light shielding film 16 is difficult in the above-described configuration. A positioning protrusion 54 may be provided near a rim of the front surface 24a as shown by a holding frame 52 of a lens unit 50 in FIG. 13. Note that the same numeral is assigned to the part with the same function and the same structure as that of the above embodiments, and descriptions thereof are omitted.

The positioning protrusion 54 has a ring-like shape along the rim of the front surface 24a. An inner diameter of the positioning protrusion 54 is the same as the diameter of the first light shielding film 16. Thereby the center of the aperture 16a of the first light shielding film 16 is easily aligned with the center of the frame opening 25 of the holding frame 52 by fitting the first light shielding film 16 inside the positioning protrusion 54.

It is preferable that the positioning protrusion 54 is lower than the top of the light incident side surface of the first lens 11. It is optimum that the height of the positioning protrusion 54 is the same as the thickness of the first light shielding film 16 as illustrated. The positioning protrusion 54 may be affixed to the front surface 24a after the positioning protrusion 54 is formed with a different component. The positioning protrusion 54 may be formed integrally with the holding frame 52. The positioning protrusion is not limited to the single ring-like positioning protrusion 54. Two or more protrusions with predetermined shape(s) may be disposed at predetermined intervals to form a ring-like shape around the rim of the front surface 24a.

In the above embodiments, the lens unit 10 which is composed of five lenses 11 to 15 is described. The number of the lenses may be two or more. In the above embodiments, disc-like lenses 11 to 15 are illustrated. The lens may have an oval plate-like shape or a polygonal plate-like shape. The holding frame and the light shielding film may be formed appropriately in accordance with the shapes of the lenses.

In the above embodiments, the protruding part 24 provided at the front end of the frame main body 23 is illustrated as a disc-like plate-shaped portion in which the frame opening 25 is formed at the center. The protruding part 24 may be composed of two or more protruding pieces protruded from outer sides of the front end of the frame main body 23 to the center. In other words, the protruding part 24 may take any shape as long as the protruding part 24 holds the second lens 12, which is inserted from the rear end side of the frame main body 23, in the optical axis direction, and forms the space in which the position of the first lens 11 is shifted and adjusted in the direction orthogonal to the optical axis and affixation of the first light shielding film 16 is allowed. In the above embodiments, the lens unit 10 used in the camera module in the mobile electronic device is described by way of example. The present invention may be applied to a lens unit of another use.

Various changes and modifications are possible in the present invention and may be understood to be within the present invention.

What is claimed is:

1. A lens unit comprising:
    a disc-like first lens having a ring-like flange portion around a lens body portion;
    a disc-like second lens having a ring-like flange portion around a lens body portion, a diameter of the second lens being greater than a diameter of the first lens;
    a holding frame comprising a cylindrically-shaped frame main body and a protruding part provided at a front end portion of the frame main body and protruding to inside of the frame main body, the frame main body having an inner diameter corresponding to the second lens, a frame opening with a size greater than the diameter of the first lens and smaller than the diameter of the second lens being formed in a center portion of the protruding part, thickness of the protruding part in an optical axis direction and thickness of the flange portion of the first lens being the same, the holding frame using the protruding part to hold the flange portion of the second lens inserted from a rear end side of the frame main body, the holding frame holding the first and the second lenses stacked in the optical axis direction in a state that a front surface of the flange portion of the first lens is flush with a front surface of the protruding part when the first lens is fitted from a front end side of the frame main body into a space surrounded by the frame opening; and
    a light shielding film through which an aperture is formed, the aperture partially exposing the lens body portion of the first lens including an optical axis, the light shielding film being affixed to at least one of the front surface of the flange portion of the first lens and the front surface of the protruding part, the light shielding film being an aperture stop for the first lens.

2. The lens unit according to claim 1, wherein the front surface of the flange portion of the first lens and the front surface of the protruding part, which are flush with each other, are in a plane orthogonal to the optical axis of the each lens.

3. The lens unit according to claim 1, wherein an adhesion recess into which an adhesive for holding the first lens is poured and a jig recess into which a part of a jig is inserted are provided close to the frame opening formed in the protruding part, and the jig is used for fitting in the first lens, and the light shielding film covers the flange portion of the first lens and each of the recesses.

4. A method for manufacturing a lens unit according to claim 1, comprising the steps of:
    (A) holding the second lens by the holding frame in a state that the flange portion of the second lens abuts on the protruding part after the second lens is inserted into the frame main body from the rear end of the frame main body;
    (B) holding the first lens by the holding frame in a state that the front surface of the flange portion of the first lens is flush with the front surface of the protruding part after the first lens is fitted into the space from the front end side of the frame main body and a back surface of the flange portion of the first lens abuts on a front surface of the flange portion of the held second lens; and
    (C) affixing the light shielding film to at least one of the front surface of the flange portion of the first lens and the front surface of the protruding part, the front surface of the flange portion of the first lens being flush with the front surface of the protruding part.

5. The method for manufacturing a lens unit according to claim 4, wherein the step (B) further includes a step (B1) of determining a position of the first lens so as to make optical properties of an image formed by the lenses favorable while the first lens is shifted in the space in a direction orthogonal to the optical axis after the first lens abuts on the second lens and a position of the first lens in the direction of the optical axis is determined, and the first lens is held by the holding frame in the position determined in the step (B1).

6. The method for manufacturing a lens unit according to claim 5, wherein a jig is used for determining the position of the first lens in the direction orthogonal to the optical axis, and an opening with the same diameter as a diameter of the aperture of the light shielding film is formed through the jig, and the opening allows the same amount of light as an amount of light in a case where the light shielding film is affixed, to enter the first lens.

* * * * *